United States Patent
Li et al.

(10) Patent No.: US 10,997,525 B2
(45) Date of Patent: May 4, 2021

(54) EFFICIENT LARGE-SCALE KERNEL LEARNING USING A DISTRIBUTED PROCESSING ARCHITECTURE

(71) Applicant: INTERNATIONAL BUSINESS MACHINES CORPORATION, Armonk, NY (US)

(72) Inventors: Shen Li, Yorktown Heights, NY (US); Xiang Ni, Yorktown Heights, NY (US); Michael John Witbrock, Ossining, NY (US); Lingfei Wu, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 819 days.

(21) Appl. No.: 15/817,544

(22) Filed: Nov. 20, 2017

(65) Prior Publication Data
US 2019/0156243 A1 May 23, 2019

(51) Int. Cl.
*G06N 20/00* (2019.01)
*G06F 40/40* (2020.01)

(52) U.S. Cl.
CPC ............. *G06N 20/00* (2019.01); *G06F 40/40* (2020.01)

(58) Field of Classification Search
CPC ...................................... G06N 20/00
USPC ..................................... 706/15, 45
See application file for complete search history.

(56) References Cited

U.S. PATENT DOCUMENTS

| | | | |
|---|---|---|---|
| 9,286,044 B2 | 3/2016 | Boehm et al. | |
| 9,626,621 B2 | 4/2017 | Dognin et al. | |
| 2012/0016816 A1 | 1/2012 | Yanase et al. | |
| 2015/0161988 A1* | 6/2015 | Dognin | G06N 3/08 704/232 |
| 2016/0048771 A1 | 2/2016 | Chen et al. | |
| 2017/0213148 A1 | 7/2017 | Mytkowicz et al. | |

OTHER PUBLICATIONS

Recht et al, "Parallel stochastic gradient algorithms for large-scale matrix completion," Math. Prog. Comp. (2013) 5:201-226.
Roux et al., "A stochastic gradient method with an exponential convergence rate for finite training sets." Advances in Neural Information Processing Systems. 2012.
(Continued)

*Primary Examiner* — David R Vincent
(74) *Attorney, Agent, or Firm* — Intelletek Law Group, PLLC; Gabriel Daniel, Esq.

(57) ABSTRACT

A method and system of creating a model for large scale data analytics is provided. Training data is received in a form of a data matrix X and partitioned into a plurality of partitions. A random matrix T is generated. A feature matrix is determined based on multiplying the partitioned training data by the random matrix T. A predicted data ŷ is determined for each partition via a stochastic average gradient (SAG) of each partition. A number of SAG values is reduced based on a number of rows n in the data matrix X. For each iteration, a sum of the reduced SAG values is determined, as well as a full gradient based on the sum of the reduced SAG values from all rows n, by distributed parallel processing. The model parameters w are updated based on the full gradient for each partition.

20 Claims, 8 Drawing Sheets

(56) References Cited

OTHER PUBLICATIONS

Lu et al., "How to Scale Up Kernel Methods to Be as Good as Deep Neural Nets," arXiv:1411.4000v2 [cs.LG] Jun. 17, 2015.
A. Rahimi and B. Recht. Random features for large-scale kernel machines. In NIPS. Curran Associates, Inc., 2007.
Hamid, et al., "Compact Random Feature Maps," Proceedings of the 31st International Conference on Machine Learning, Beijing, China, 2014. JMLR: W&CP vol. 32.
Polyak et al., "Acceleration of Stochastic Approximation by Averaging," SIAM Journal on Control and Optimization • Jul. 1992.
Yang et al., "A Parallel Decomposition Method for Nonconvex Stochastic Multi-Agent Optimization Problems," IEEE Transactions on Signal Processing, vol. 64, No. 11, Jun. 1, 2016.
Lin, Chieh-Yen, et al. "Large-scale Logistic Regression and Linear Support Vector Machines Using Spark," IEEE 2014 Conference on Big Data (Oct. 28, 2014), pp. 1-58.
Mell P. et al., "Recommendations of the National Institute of Standards and Technology"; NIST Special Publication 800-145 (2011); 7 pgs.

\* cited by examiner

EFFICIENT LARGE-SCALE KERNEL LEARNING USING A DISTRIBUTED PROCESSING ARCHITECTURE

BACKGROUND

Technical Field

The present disclosure generally relates to parallel execution of machine learning, and more particularly, to parallelization strategies for machine learning on top of a MapReduce paradigm.

Description of the Related Art

In recent years, large-scale analytics on top of MapReduce is becoming increasingly relevant for various organizations in order to gain value from large amounts of collected data. MapReduce is a paradigm for processing and generating big data sets with a parallel, distributed algorithm on a cluster. Machine learning on top of MapReduce may leverage data parallelism. One framework related to the MapReduce paradigm includes Apache Spark, which provides an interface centered on a data structure, sometimes referred to as a resilient distributed dataset (RDD), which is a read-only multiset of data items that are distributed over a cluster of machines. Spark MLlib is a distributed machine learning framework on top of Spark Core.

SUMMARY

According to various embodiments, a computing device, a non-transitory computer readable storage medium, and a method are provided of creating a model for large scale data analytics via a distributed processing approach. Training data is received in a form of a data matrix X and partitioned into a plurality of partitions. A random matrix T is generated, having size d*r, where r is a number of rows in the matrix T. A feature matrix is determined based on multiplying the partitioned training data by the random matrix T. A predicted data ŷ is iteratively determined for each partition via a stochastic average gradient (SAG) of each partition. A number of SAG values are reduced based on a number of rows n in the data matrix X. For each iteration, a sum of the reduced SAG values is determined. Further, a full gradient is determined based on the sum of the reduced SAG values from all rows n in the data matrix X, by distributed parallel processing via a distribution and function. The model parameters w are updated based on the full gradient for each partition.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
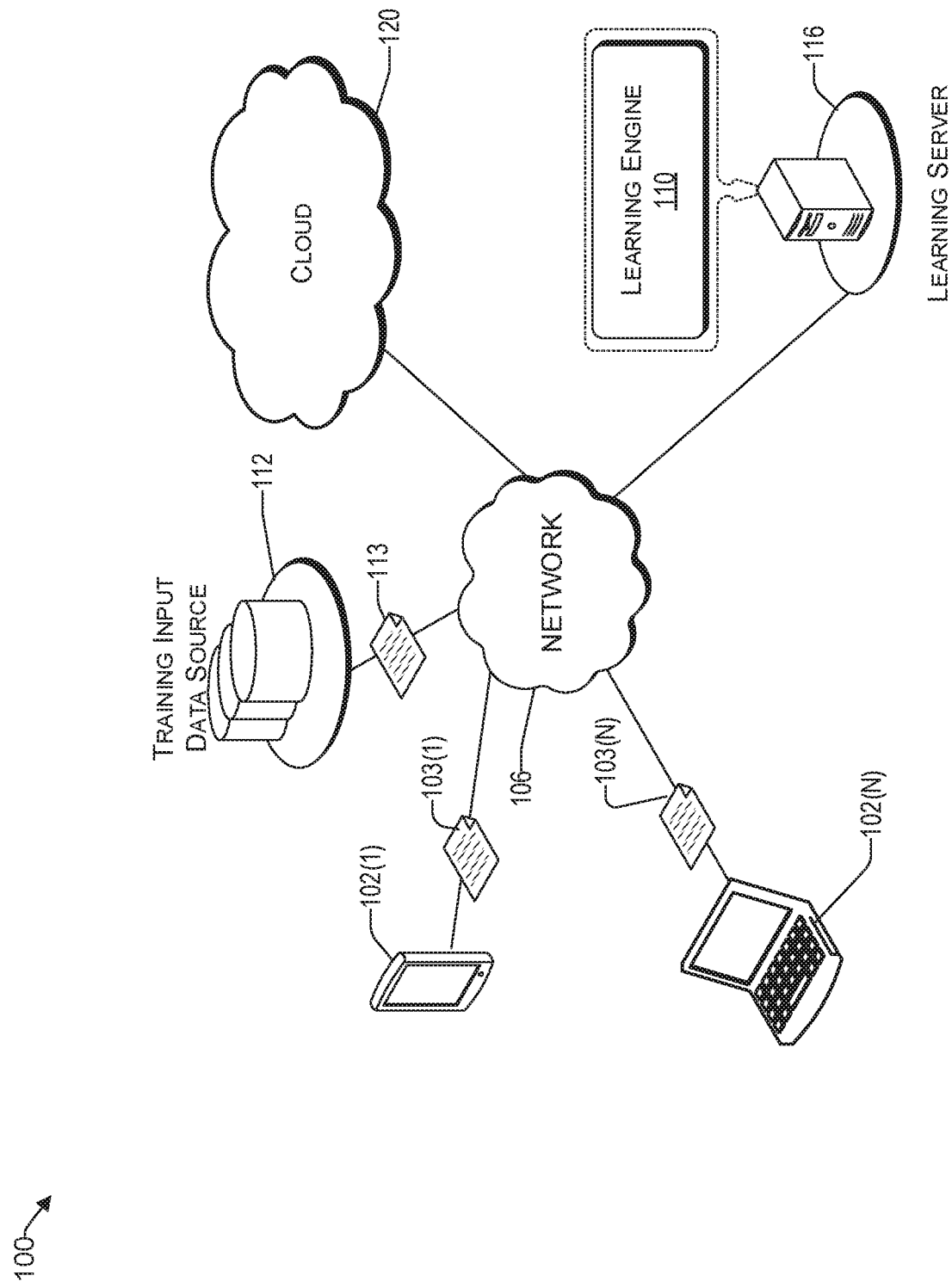
FIG. 1 illustrates an example architecture for implementing an efficient large-scale kernel learning with parallel random features and stochastic average gradient using a MapReduce paradigm.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of large scale data analytics via a distributed processing approach. Large-scale data analytics is becoming increasingly relevant in various industries, including healthcare, mobile device, and automotive, to provide value from large amounts of collected data. Finding insightful facts and patterns often involves analysis of a full data set instead of applying sampling techniques. This challenge may be addressed by leveraging parallel programming paradigms such as MapReduce (MR), its open-source implementation Hadoop, Apache Spark, or more general data flow abstractions, collectively referred to herein as the MapReduce paradigm. These frameworks enable large-scale, fault-tolerant, and cost-effective parallelization on computing hardware.

The Apache Spark Machine Learning Library (MLlib) is a distributed machine learning framework on top of the Spark Core. It generally supports linear kernels for regression and classification tasks. However, Spark MLlib has limitations for many applications because of its lack of support of non-linear kernels. Typical non-linear kernel machines do not scale large data sets due to the quadratic relationship to the volume of input data, which makes data processing impractical. For example, the volume of data may be described by the relationship $O(N^2)$, where O is an upper bound of complexity and/or memory consumption for a computation, and N represents the number of data samples. As the number of data samples increases, the resulting computational complexity makes scaling the data impractical.

It is noted that linear models are typically more powerful in terms of being able to handle complex data, than non-linear models, including non-linear kernel methods. However, linear models are often high dimensional, which may result in various problems, sometimes referred to as the "curse of dimensionality." Kernel methods allow learning non-linear functions using linear feature spaces. A "kernel trick" can be used, where instead of directly learning a classifier in $R^d$, a non-linear mapping $\theta: R^d \to H$ is used (where H is the non-linear feature space). With an increase in training data, the support of the vector w (a model parameter) can undergo excessive growth, which can result in increased training time. The non-linear feature space H can be embedded into a low dimensional space.

However, non-linear kernels cannot be readily split and parallelized, while linear kernels can. Linear kernels can be trained quickly on large datasets, particularly when the dimensionality of the data is small. In one aspect, what is disclosed herein is a linear kernel method that allows the data to be split (sometimes referred to herein as partitioned) and processed in parallel. Thus, in one embodiment, the linear kernel method discussed herein outperforms known large scale kernel machines. Stated differently, the advantages of the linear and nonlinear approaches are combined to provide a computationally efficient computing infrastructure.

One of the most successful class of algorithms for large-scale supervised machine learning is the stochastic gradient (SG) method, which is a stochastic approximation of the gradient optimization method for minimizing an objective function that is written as a sum of differentiable functions. In other words, the SG attempts to find minima or maxima by iteration. SG methods include standard full gradient (FG), where the scaling is performed linearly for a number of data points. FG can achieve linear convergence. In basic stochastic gradient (SG), the scaling is performed independent of the number of data points. However, only sublinear convergence is achieved. In one embodiment, a stochastic average gradient (SAG) is used, where scaling is performed independent of the number of data points. Advantageously, convergence can be achieved.

Reference now is made in detail to the examples illustrated in the accompanying drawings and discussed below.

Example Architecture

FIG. 1 illustrates an example architecture 100 for implementing an efficient large-scale kernel learning with parallel random features and stochastic average gradient (SAG) using a MapReduce paradigm, such as spark. Architecture 100 includes a network 106 that allows various computing devices 102(1) to 102(N) to communicate with each other, as well as other elements that are connected to the network 106, such as a training data source 112, a learning server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the learning engine 110, which is a software program running on the learning server 116, to communicate with a training data source 112, computing devices 102(1) to 102 (N), and the cloud 120, to provide linear kernel learning, wherein the data processing is performed at least in part on the cloud 120, in parallel.

For purposes of later discussion, several user devices appear in the drawing, to represent some examples of the computing devices that may trigger machine learning by the learning engine 110 via the network 106. Today, user devices typically take the form of portable handsets, smartphones, tablet computers, personal digital assistants (PDAs), and smart watches, although they may be implemented in other form factors, including consumer, and business electronic devices.

For example, a computing device (e.g., 102(N)) may issue a request 103(N) to the learning engine 110, such that the learning engine 110 creates a learning model for a system, such as a healthcare system, a banking system, image recognition system, etc. In some embodiments, the training data to be processed is in a training data source 112 that is configured to provide the training data 113 via the network 106 in response to a trigger event.

While the training data source 112 and the learning server are illustrated by way of example to be on different platforms, it will be understood that in various embodiments, the training data source 112 and the learning server may be combined. In other embodiments, these computing platforms may be implemented by virtual computing devices in the form of virtual machines or software containers that are hosted in a cloud 120, thereby providing an elastic architecture for processing and storage.

Example Large Scale Kernel Learning

In machine learning, a kernel machine is an algorithm for pattern analysis. A common kernel machine is the Support Vector Machine (SVM), which can approximate a function when provided with sufficient training data. As mentioned above, linear models do not scale well with the size of the training dataset, typically resulting in the consumption of substantial computing resources and time, thereby making a traditional linear approach impractical. However, linear machines can be trained relatively quickly on large datasets, particularly when the dimensionality of the data is small. In one approach, the kernel function itself is factored, which does not depend on the training data and provides for the conversion of the training and evaluation of the kernel machine into a corresponding operation of a linear machine. This is achieved by mapping data into a relatively low-dimensional randomized feature space. The combination of the random features with the linear method learning techniques, provide accurate and time efficient results of the pattern analysis.

In one embodiment, the training data is mapped to a low-dimensional inner product space using a randomized feature matrix Z, such that the product between a pair of transformed points approximates their kernel evaluation. Accordingly, the input is transformed with a randomized feature matrix Z to provide a lower dimension data set. The efficient linear learning kernels can then be used to approximate the answer of the corresponding nonlinear kernel machine.

Thus, the input training data is transformed to a lower-dimension feature space using a randomized feature matrix $Z: R^d \to R^r$ in parallel, where Z is the randomized feature map (sometimes referred to herein as the feature matrix), R is the real vector having a dimension d (e.g., the number of random features there are), and r is the resulting number of dimensions (e.g., the number of random features that are used) after applying the randomization feature. In this way, the inner product between a pair of transformed training data points approximates their kernel evaluation.

Upon completing the transformation to a lower-dimension feature space, a linear learning method for efficient kernel learning can be applied. For example, a SAG approximation approach can be used. Accordingly, the proposed kernel approximation techniques discussed herein can disentangle non-linear feature space learning with a fast-linear model learning using random features and with an efficient stochastic average gradient. In one embodiment, the non-linear transformed feature matrix from the input training data can be processed in parallel on a MapReduce paradigm, such as Spark. In this way, an efficient and large-scale linear classification and regression system based on a nonlinear feature matrix can be processed on Spark.

Figure 2:
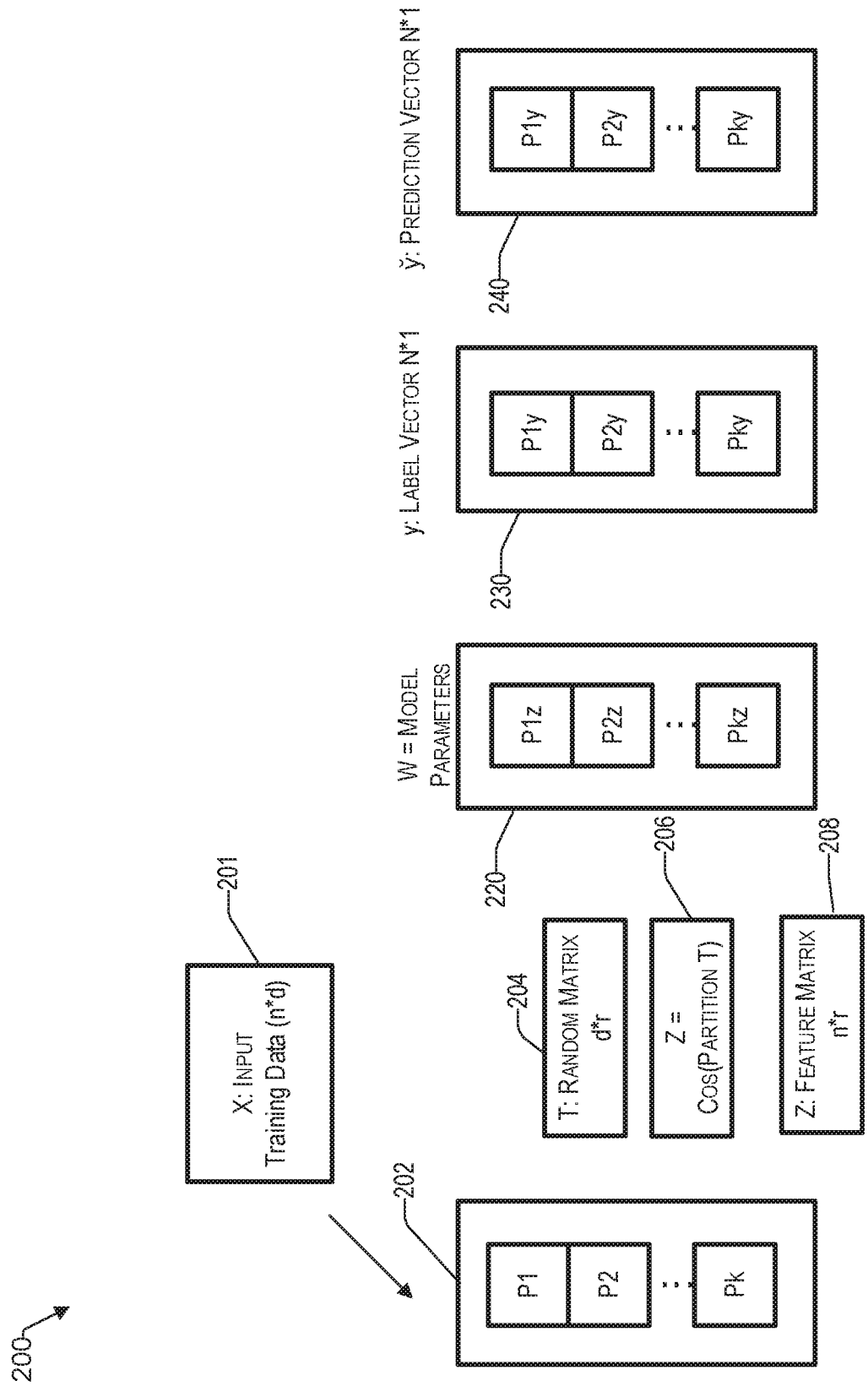
FIG. 2 is a block diagram that conceptually illustrates an example partitioning of training data.

Example Partitioning of Data and Generation of a Feature Matrix Using Random Features FIG. 2 is a block diagram that conceptually illustrates an example partitioning of training data. There is an input training data matrix X 201 of size n*d, where "n" represents the number of data points (sometimes referred to as samples) and "d" represents the number of features (sometimes referred to as dimensions). The input training data may be from various applications, such as speech recognition, image classification, neuro linguistic programming (NLP), etc. The input training data matrix X is partitioned into k partitions, as indicated by block 202. In various embodiments, the number of partitions k may be predetermined or computed by the learning engine. For example, the predetermined number of partitions k may be 10. Accordingly, the input training data of the matrix X is divided and stored into partitions P1 to Pk, where each partition (sometimes referred to herein as a node) P represents a different processing location that the input training data has been partitioned to.

Block 204 represents a random matrix T 204 having size d*r, where parameter "r" represents the resulting number of dimensions (e.g., rows) and d is the dimension of the training data matrix X. The random matrix T 204 is generated by the random features technique discussed above. In one embodiment, if parameter "r" exceeds a predetermined threshold, the random matrix T 204 is calculated in batch.

This random matrix T 204 can be used to create a randomized feature matrix Z, having dimensions n*r, represented by blocks 206 and 208, respectively. In one embodiment, each partition has a different random matrix T 204.

For example, upon partitioning, the feature matrix Zi has a size (n/p)*r. The feature matrix Zi can be provided by equation 1 below, where I stands for the $i^{th}$ partition of Z in node i:

$$Zi = \cos(Xi*T)/\operatorname{sqrt}(n) \quad \text{(Eq. 1)}$$

where,
T is a random matrix of size d*r,
Xi is the input training data,
n is the number of sample points, and
i is =1, 2, . . . , p.

In various embodiments, the random matrix T may be generated in different ways, depending on the kernel function that is used. For example, if the kernel function is a Gaussian function, then the corresponding distribution is Gaussian distribution. If the kernel function is a Laplacian function, then the corresponding distribution is the Gamma distribution.

In the example of block 206, the feature matrix is cos (partition T), while it will be understood that other functions can be implemented as well. The random matrix T 204 can be generated independently in each node. The computation of Zi can be carried out independently without any communication regarding equation 1.

Block 220 represents linear model parameters Plz to Pkz that have been transformed by the random matrix T 204. The linear model w 220 is what the learning engine 110 is trying to create. Block 230 represents the output data y, which can be compared to the predicted data represented by block 240. The output data y in block 230 is the label data that is part of the raw data. The predicted data ŷ 240 is computed by the model ŷ=Z^T*w, where Z^T is the transpose of the whole feature matrix Z (including all partitions Zi in each node) and w is the weight vector. The closer the output data y to the predicted data ŷ 240, the more accurate the model parameters 220.

Example Process

Figure 3:
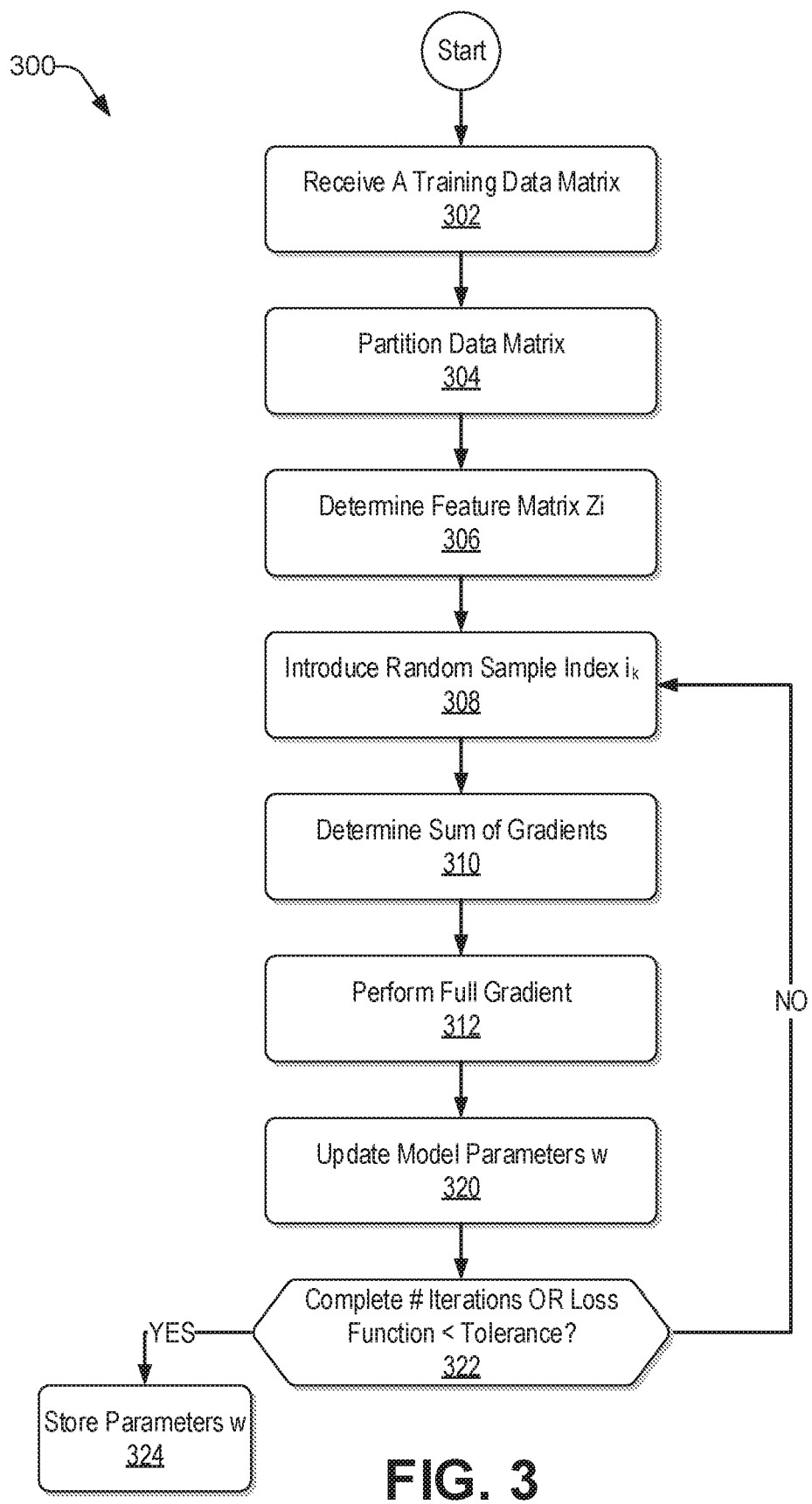
FIG. 3 presents an illustrative process for an efficient large-scale kernel learning with parallel random features and stochastic average gradient on a MapReduce paradigm.

With the foregoing overview of the example architecture 100 and example partitioning of data and generation of a feature matrix using random features 200, it may be helpful now to consider a high-level discussion of an example process. To that end, FIG. 3 presents an illustrative process 300 for an efficient large-scale kernel learning with parallel random features and stochastic average gradient on a MapReduce paradigm, such as Apache Spark.

Process 300 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 300 is described with reference to the architecture 100 of FIG. 1 and the block diagram 200 of FIG. 2.

At block 302 training data 113 in the form of a data matrix is received by the learning engine 110. The input training data may be received from various applications, such as speech recognition, image classification, neuro linguistic programming (NLP), etc., represented by training data source 112. This input data can be used as training data to develop a learning model for efficiently processing the data to identify patterns therefrom.

At block 304, the input training data is partitioned into a plurality of nodes k 202 (sometimes referred to herein as partitions), as discussed in the context of FIG. 2. A random matrix T is generated having size d×r. The partitioned data is multiplied by the random matrix T.

At block 306, a randomized feature map (sometimes referred to herein as the feature matrix Zi) is determined based on the partitioned training data matrix and the random matrix T.

At block 308, for each iteration of a stochastic average gradient (SAG), a random sample index $i_k$ is selected to create predicted data for each partition. In each iteration, each partition of the predicted data ŷ 240 is updated. In one embodiment, the expression for ŷ 240 is provided by equation 2 below:

$$\hat{y}^{(ik)} = Z_i^{(ik)} * w \quad \text{(Eq. 2)}$$

where,
$Z_i$ is the $i^{th}$ part of a random feature matrix in the $i^{th}$ compute node;
$i_k$ is a random sample index, and
w is a weight vector that is being learned for the model from the feature matrix.

The above adjustment is performed for each partition of the predicted data 240. The previous gradient g (of the objective function in equation 3 below) need not be maintained for each variable and each sample of the raw training data. Rather, only the value $\tilde{y}^{(ik)}$ for each partition of the expected data is maintained to re-compute gradient g when appropriate. In this way, the number of gradient values can be reduced from O(n*r) to O(n), where O refers to an upper bound of computational complexity. For example, the variables discussed above refer to the column feature of the raw training data. Each row of raw training data is referred to herein as a sample. If there are n number of rows in the raw training data, then there are n samples. Accordingly, the number of SAG values is reduced based on a number of rows n in the data matrix of the raw training data.

The SAG can be computed in a number of ways. For example, consider a L2-regularized empirical risk minimization problem, provided by equation 3 below:

$$\underset{w}{\operatorname{argmin}} \frac{1}{n} \sum_{i=1}^{n} l(y, z^T w) + \frac{\lambda}{2} \|w\|^2 \quad \text{(Eq. 3)}$$

where,
l is the underlying loss function that describes the cost of predicting y,
y is the label vector from the raw input training data;
$z^T$ is the transpose of the random feature matrix Z and
$\lambda$ is a parameter that controls the significance of the regularization term.

The loss function l could be a least square loss and a logistic loss. Based on the feature matrix Z, the learning engine can focus on the kernel ridge regression and kernel logistic regression. The SAG uses the iterations provided in equation 4 below:

$$w^{m+1} = w^m - \alpha^m \Sigma g_i^m / n \quad \text{(Eq. 4)}$$

where,
$\alpha^m$ is the step size of the gradient in each iteration of SAG;
n is the total number of samples in the raw input training data X, $g_i^m = f'_i(x^k), i = i_k$ $g_i^m = g_i^{m-1}, i \neq i_k$ m is the iteration number, and
$i_k$ is the current sample index.

To save only O(n) previous gradient values instead of O(n*r), only the expression of equation 2 above is updated in each corresponding node (i.e., partition) based on the randomly chosen train sample Z(ik) that is located in partition $P_i$ (i.e., the $i^{th}$ node partition).

At block 310 the sum of the values of the gradients is determined. In order to update the model parameter w, the sum of the values of the gradients g (e.g., gradient from a currently selected sample in one iteration plus all previous gradients associated with each sample) in each node is determined. For example, referring back to equation 4 above, the local sum of gradients in each node can be provided by equation 5 below:

$$g^m = Z_{P_i}^T (y_{P_i} - \tilde{y}p_i^m) \quad \text{(Eq. 5)}$$

At block 312 a full gradient is determined for the present SAG iteration based on a sum of gradients from all samples). To that end, a programming model for processing and generating data sets with a parallel, distributed algorithm is used (e.g., a distribution and reduction function), such as a message passing interface (MPI) AllReduce. In this way, a full gradient, based on the sum of the gradients from all samples (e.g., rows n) in the present iteration are calculated for each partition.

At block 320, the model parameters w 220 are updated based on the gradient information for each partition. Referring back to equation 4, we define the local sum of gradients as follows:

$$g^m = \Sigma g_i^m / n \quad \text{(Eq. 6)}$$

Accordingly, the model parameters (i.e., weight vector) w can be continuously updated, as provided by equation 7 below:

$$w^{m+1} = w^m - \alpha^m g^m \quad \text{(Eq. 7)}$$

The step size $\alpha$ is updated by a periodic linear search to adhere to a predetermined performance. For example, the step size can be increased linearly until an appropriate step size is achieved. Linear search is used to determine how large the parameter $\alpha$ should be such that the objective function of equation 3 above decreases most. For example, the learning engine 110 may start with a small number (e.g., 1e-4) and double the number in every iteration until the value of the objective function reaches its minimal value in that iteration. Stated differently, the iterations may continue until the loss function of equation 3 above is within a predetermined tolerance, sometimes referred to herein as achieving convergence (i.e., "NO" at decision block 322). However, upon completing a predetermined number of iterations and/or the loss function being within a predetermined tolerance (i.e., "YES" at decision block 322), the process continues with block 324 where the model parameter w is stored.

Example Lineage Graphs for a MapReduce Paradigm

Figure 4:
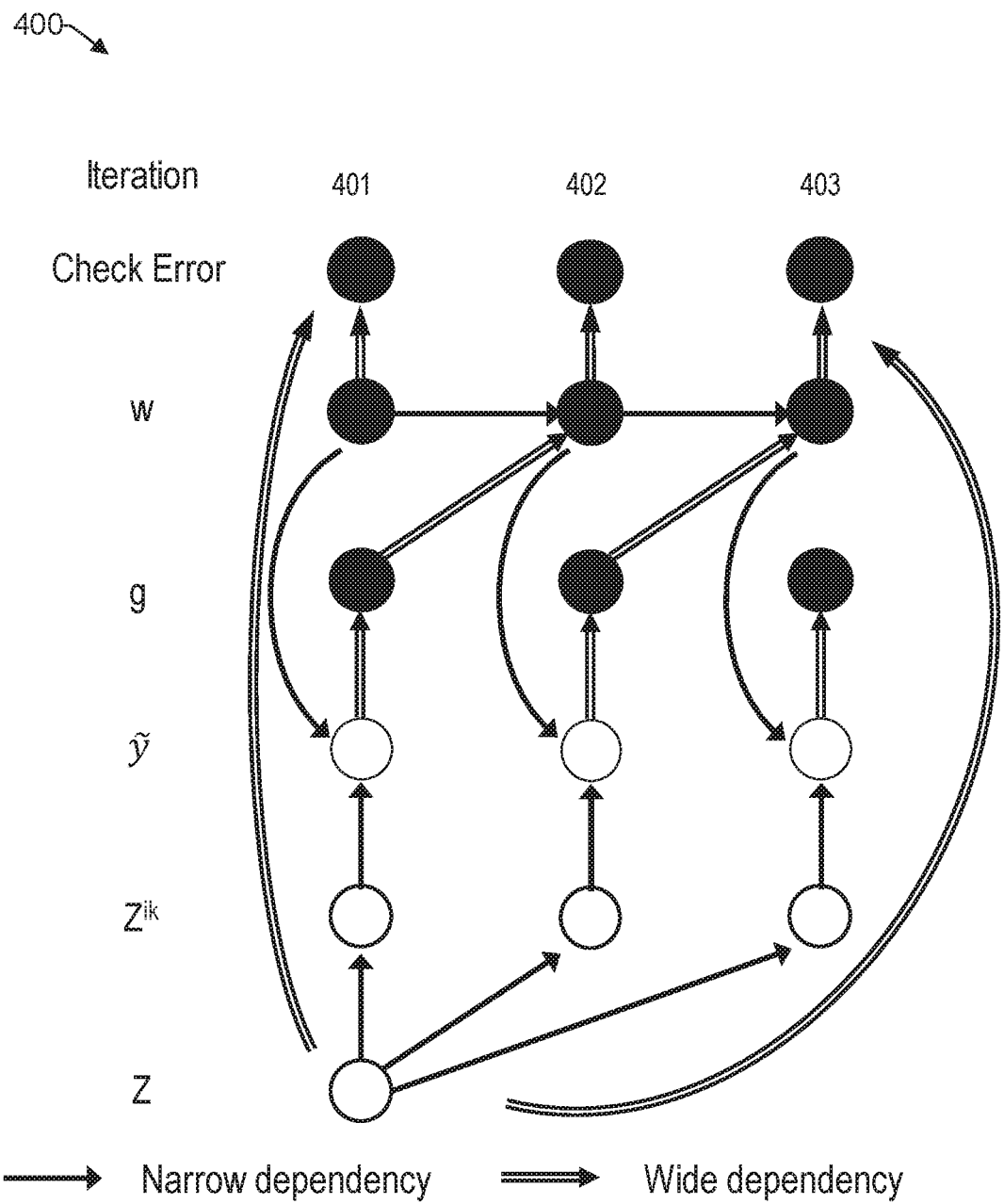
FIG. 4, which an example lineage graph that illustrates dependencies of parameters for different iterations.

Reference now is made to FIG. 4, which an example lineage graph 400 that illustrates dependencies of parameters for different iterations. In distributed systems, a job may comprise of multiple tasks, where each task may be running on a different computing node (e.g., server). The input data of the job is partitioned into splits (i.e., partitions), and the system will be responsible for feeding each split to a different task. If all tasks of a job are able to access their input data from their local servers, such job is referred to herein as a "narrow dependency job." Otherwise, if tasks of a job have to be retrieved from remote servers, such job is considered herein to have "a wide dependency job," which is to be minimized. Indeed, narrow jobs are more efficient than wide jobs in distributed systems, as they avoid the data transmission step prior to carrying out computations. Hence, in one embodiment, wide jobs are avoided as much as practically possible.

Lineage graph 400 demonstrates a system design, consistent with an illustrative embodiment. Each column 401 to 403 column corresponds to a different iteration. Every row represents the same variable (e.g., check error, w, g, $\tilde{y}$, $Z^{ik}$, Z) across multiple iterations. Double-line incoming arrows represent wide dependency jobs, and single line arrows represent narrow dependency jobs. The variables produced by a wide dependency job have a solid fill while variables produced by narrow dependency job have a hollow fill. In the example of FIG. 4, three nodes (dataset) require wide dependency jobs to generate parameters g, check error, and $\tilde{y}$. To calculate g, the learning engine applies an AllReduce operation to collect data from all servers. Before calculating $\tilde{y}$, the latest value of w is broadcast to all nodes (e.g., servers). Next, another AllReduce operation is applied to check the error between the estimation and the ground truth. Accordingly, every iteration would run three wide dependency jobs.

Figure 5:
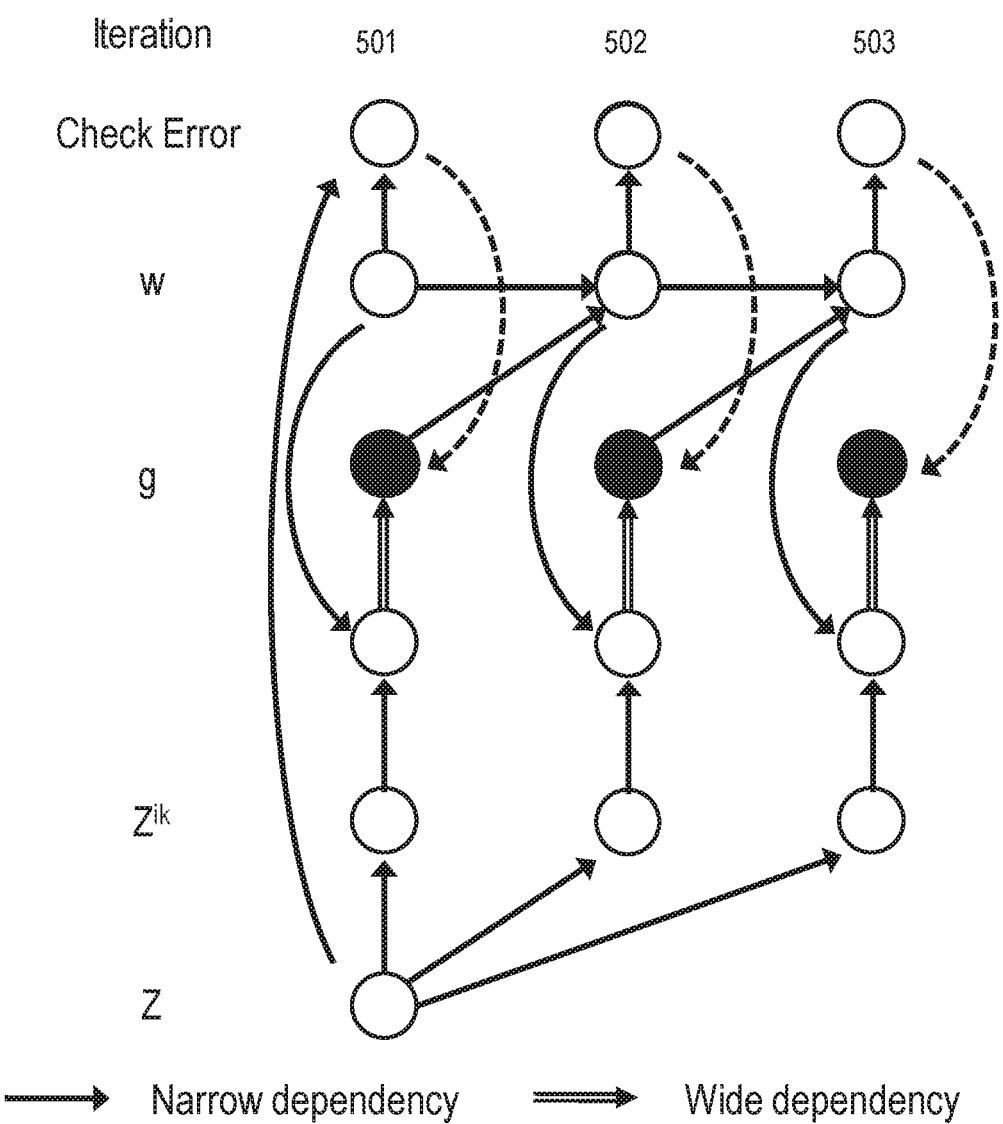
FIG. 5 illustrates an improved lineage graph that has been configured to have a narrow dependency.

By way of contrast, FIG. 5 illustrates an improved lineage graph 500 that has more narrow dependency. More particularly, the three wide dependency jobs related to check error, w, and g of FIG. 4, are reduced to one (i.e., g). To that end, the learning engine creates the w variable (dataset) such that every partition includes a full replication of all coefficients. This fix helps to avoid broadcasting w in every iteration. A synthetic dependency is added between the check error RDD and g to calculate these parameters in a single synchronization. As the check error and g parameters now do not depend on each other in the same iteration, these two datasets are merged and compute these parameters using a single wide dependency job. Accordingly, a resilient distributed dataset (RDD) of each partition is created such that all coefficients in calculations in each iteration are replicated in every partition, thereby creating a narrow dependency between the partitions.

Example Computer Platform

Figure 6:
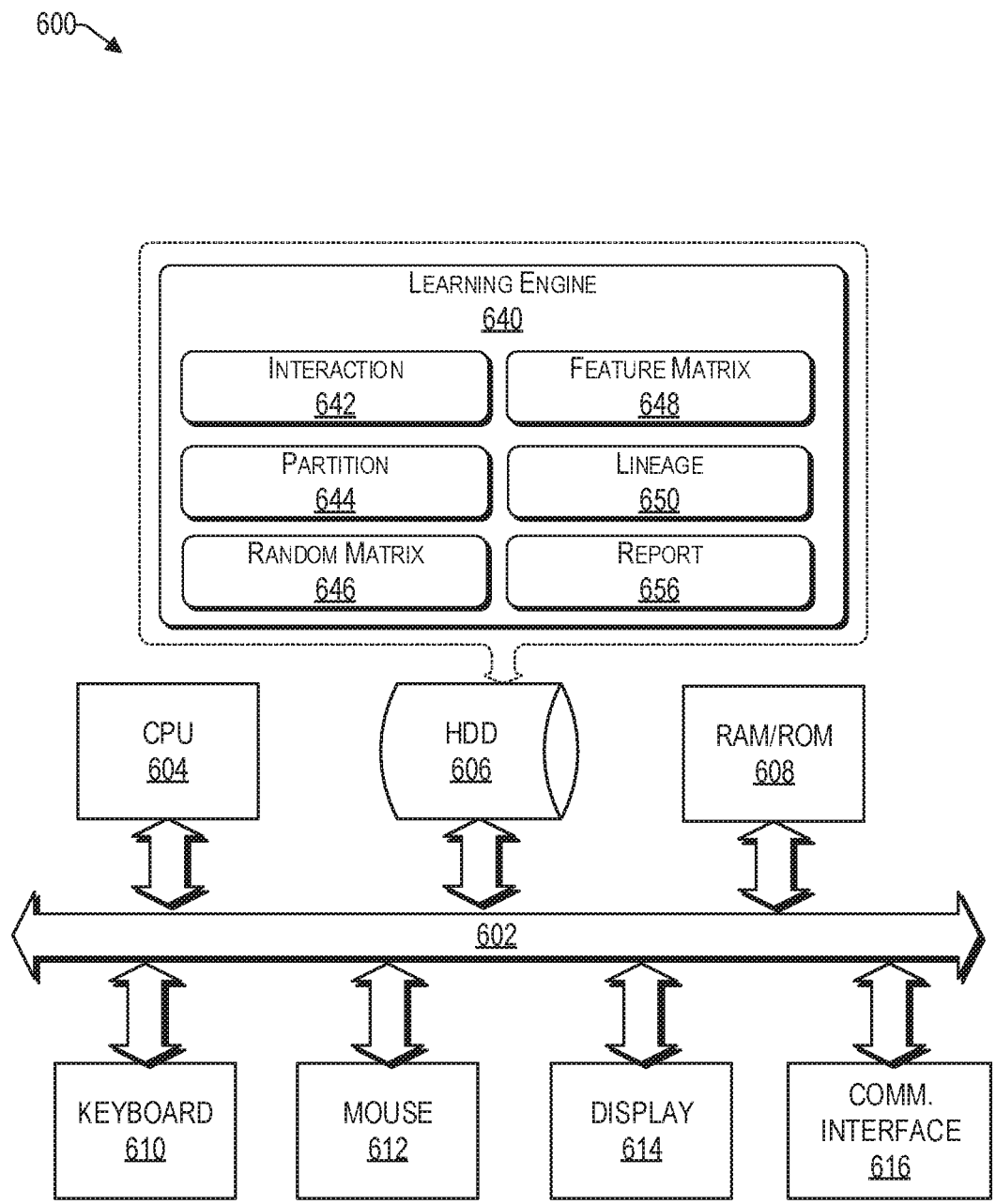
FIG. 6 is a functional block diagram illustration of a computer hardware platform that can communicate with various networked components, consistent with an illustrative embodiment.

As discussed above, functions relating to an efficient large-scale kernel learning with parallel random features and stochastic average gradient on a MapReduce paradigm can be performed with the use of one or more computing devices connected for data communication via wireless or wired communication, as shown in FIG. 1 and in accordance with the process 300 of FIG. 3. FIG. 6 is a functional block diagram illustration of a computer hardware platform that can communicate with various networked components, such as a training input data source, the cloud, etc. In particular, FIG. 6 illustrates a network or host computer platform 600, as may be used to implement a server, such as the learning server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the learning engine 640, in a manner described herein. The learning engine 640 may have various modules configured to perform different functions.

For example, there may be an interaction module 642 that is operative to receive instructions from one or more computing devices to initiate generating a learning model, receive training data from the training data source, as discussed herein.

In one embodiment, there is partition module 644 operative to partition the received input training data X into a number of partitions.

In one embodiment, there is a random matrix module 646 operative to generate a random matrix T having dimensions d×r. This generated random matrix T can be multiplied with the partition input training data.

In one embodiment, there is a randomized feature matrix module 648 operative to create a randomized feature matrix by taking the cosine partitioned input training data that was multiplied by the random matrix T.

In one embodiment, there is a lineage module 650 operative to partition the input training data in such a way where coefficients are replicated in every partition to reduce dependency between calculated parameters.

In one embodiment, there is a report module 656 operative to report the completion of the generation of a model, to one or more appropriate recipients.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Example Cloud Platform

As discussed above, functions relating to an efficient large-scale kernel learning with parallel random features and stochastic average gradient on a MapReduce paradigm, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
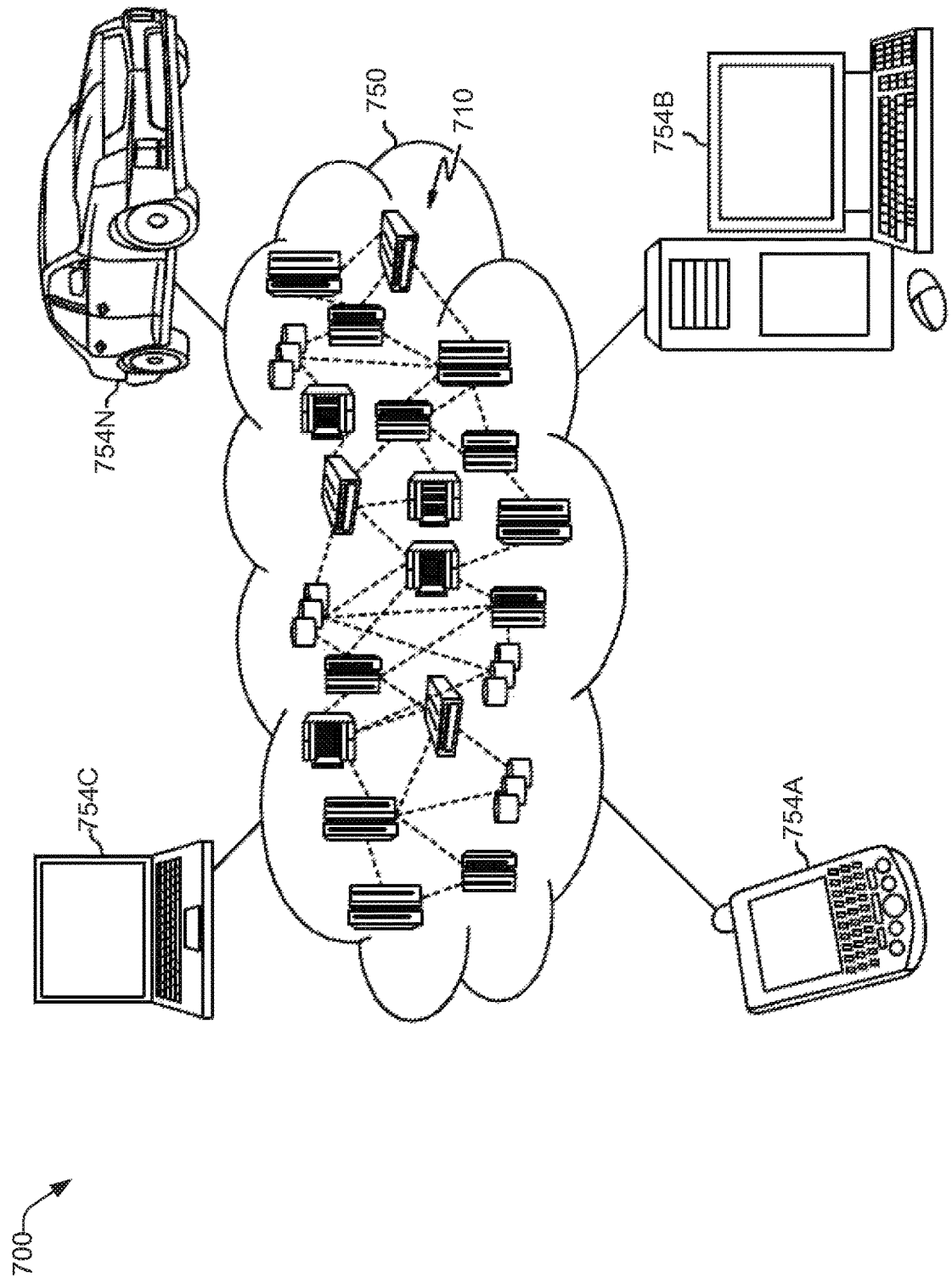
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
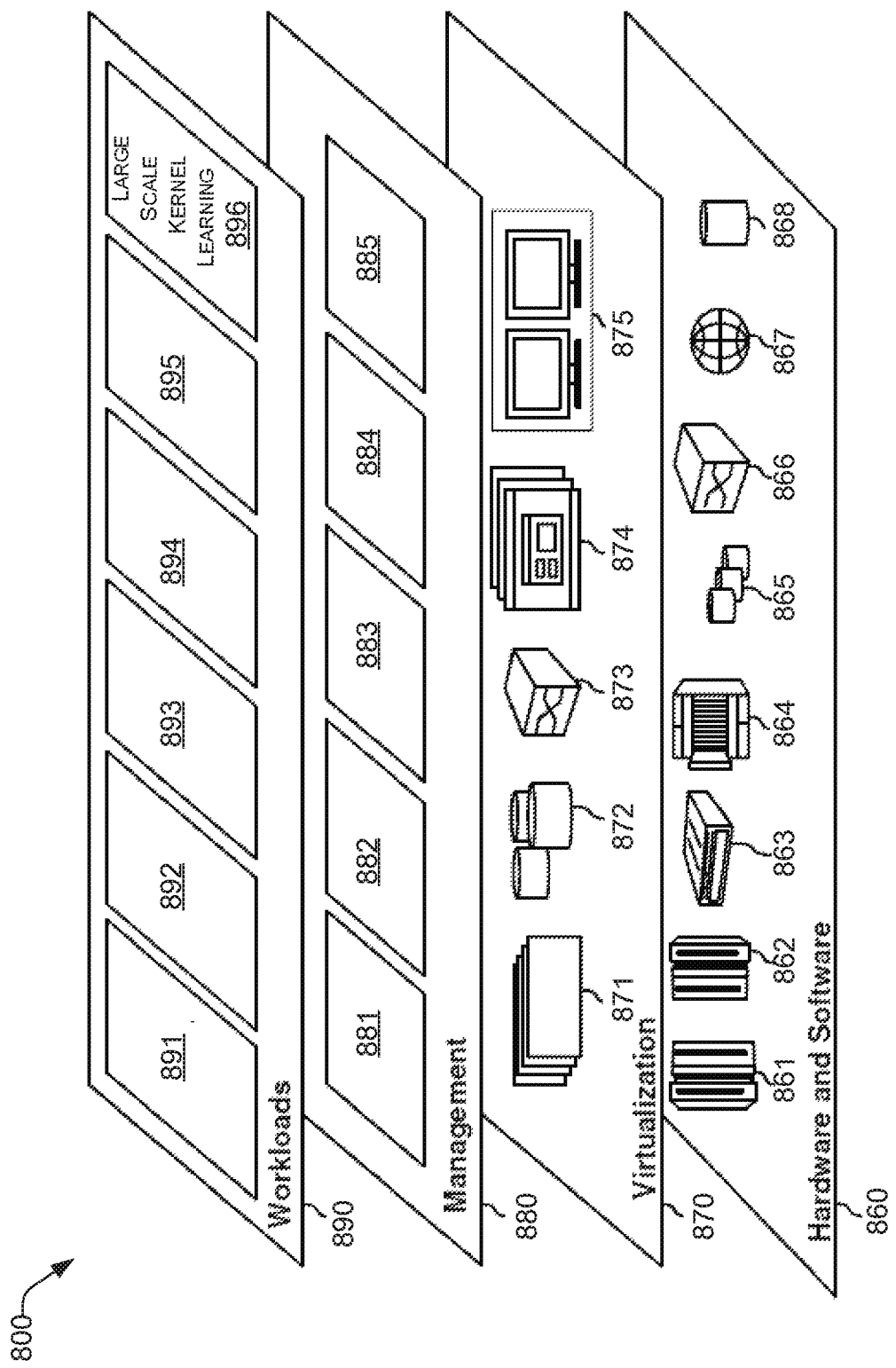
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and large scale kernel learning 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a learning engine stored in the storage device, wherein an execution of the learning engine by the processor configures the computing device to perform acts comprising:
receiving training data in a form of a data matrix X;

partitioning the training data into a plurality of partitions;
generating a random matrix T having a size d*r, where r is a number of rows in the matrix T;
determining a feature matrix based on multiplying the partitioned training data by the random matrix T;
iteratively determining a predicted data ỹ for each partition via a stochastic average gradient (SAG) of each partition and the feature matrix;
reducing a number of SAG values based on a number of rows n in the data matrix X;
for each iteration:
    determining a sum of the reduced SAG values;
    determining a full gradient based on the sum of the reduced SAG values from all rows n in the data matrix X, by distributed parallel processing via a distribution and reduction function; and
    updating model parameters w based on the full gradient for each partition.

2. The computing device of claim 1, wherein the training data is based on at least one of:
speech recognition;
image classification; and
neuro linguistic programming (NLP).

3. The computing device of claim 1, wherein iteratively determining a predicted data ỹ for each partition comprises:
selecting a random sample index ik to create the predicted data ỹ for each partition; and
updating the predicted data ỹ for each partition after each iteration based on a minimization of a loss function.

4. The computing device of claim 1, wherein the predicted data is based on:

$$\tilde{y}^{(ik)} = Z_i^{(ik)} * w$$

wherein:
Zi is an ith part of a random feature matrix in an ith node of a plurality of nodes k;
ik is the random sample index; and
w is a weight vector model parameter from the feature matrix.

5. The computing device of claim 4, wherein execution of the learning engine by the processor further configures the computing device to perform acts comprising, for each iteration, updating a step size α by a periodic linear search for the weight vector model parameter w.

6. The computing device of claim 1, wherein the SAG is computed based on an L2-regularized empirical risk minimalization problem.

7. The computing device of claim 6, wherein the SAG is based on a ridge regression.

8. The computing device of claim 1, wherein execution of the learning engine by the processor further configures the computing device to perform acts comprising, continuing the iterative determination of the predicted data ỹ for a predetermined number of iterations.

9. The computing device of claim 1, wherein execution of the learning engine by the processor further configures the computing device to perform acts comprising, continuing the iterative determination of the predicted data ỹ until a loss function is within a predetermined tolerance.

10. The computing device of claim 1, wherein partitioning the training data comprises: creating a resilient distributed dataset (RDD) of each partition such that all coefficients in calculations in each iteration are replicated in every partition, to create a narrow dependency between the partitions.

11. A non-transitory computer readable storage medium tangibly embodying a computer readable program code having computer readable instructions that, when executed, causes a computer device to carry out a method of creating a model for large scale data analytics via a distributed processing approach, the method comprising:
receiving training data in a form of a data matrix X;
partitioning the training data into a plurality of partitions;
generating a random matrix T having a size d*r, where r is a number of rows in the matrix T;
determining a feature matrix based on multiplying the partitioned training data by the random matrix T;
iteratively determining a predicted data ỹ for each partition via a stochastic average gradient (SAG) of each partition;
reducing a number of SAG values based on a number of rows n in the data matrix X;
for each iteration:
    determining a sum of the reduced SAG values;
    determining a full gradient based on the sum of the reduced SAG values from all rows n in the data matrix X, by distributed parallel processing via All-Reduce; and
    updating model parameters w based on the full gradient for each partition.

12. The non-transitory computer readable storage medium of claim 11, wherein the training data is based on at least one of:
speech recognition;
image classification; and
neuro linguistic programming (NLP).

13. The non-transitory computer readable storage medium of claim 11, wherein iteratively determining a predicted data ỹ for each partition comprises:
selecting a random sample index ik to create the predicted data ỹ for each partition; and
updating the predicted data ỹ for each partition after each iteration based on a minimization of a loss function.

14. The non-transitory computer readable storage medium of claim 11, wherein the predicted data is based on:

$$\tilde{y}^{(ik)} = Z_i^{(ik)} * w$$

wherein:
Zi is an ith part of a random feature matrix in an ith node of a plurality of nodes k;
ik is the random sample index; and
w is a weight vector model parameter from the feature matrix.

15. The non-transitory computer readable storage medium of claim 14, further comprising, for each iteration, updating a step size α by a periodic linear search for the weight vector model parameter w.

16. The non-transitory computer readable storage medium of claim 11, wherein the SAG is computed based on an L2-regularized empirical risk minimalization problem.

17. The non-transitory computer readable storage medium of claim 16, wherein the SAG is based on a ridge regression.

18. The non-transitory computer readable storage medium of claim 11, further comprising, continuing the iterative determination of the predicted data ỹ for a predetermined number of iterations.

19. The non-transitory computer readable storage medium of claim 11, further comprising, continuing the iterative determination of the predicted data ỹ until a loss function is within a predetermined tolerance.

20. The non-transitory computer readable storage medium of claim 11, wherein partitioning the training data comprises: creating a resilient distributed dataset (RDD) of each partition such that all coefficients in calculations in each iteration are replicated in every partition, to create a narrow dependency between the partitions.

* * * * *